US012643626B2

(12) United States Patent
Sarka et al.

(10) Patent No.: US 12,643,626 B2
(45) Date of Patent: Jun. 2, 2026

(54) PEDAL BAR SYSTEM AND METHOD

(71) Applicant: SARKA PARTY BIKE, LLC, Tiffin, OH (US)

(72) Inventors: Kendall Todd Sarka, Tiffin, OH (US); Richard L Sutter, III, Tiffin, OH (US); Stephen J. Steinmetz, Tiffin, OH (US)

(73) Assignee: SARKA PARTY BIKE, LLC, Tiffin, OH (US)

( * ) Notice: Subject to any disclaimer, the term of this patent is extended or adjusted under 35 U.S.C. 154(b) by 323 days.

(21) Appl. No.: 18/448,533

(22) Filed: Aug. 11, 2023

(65) Prior Publication Data

US 2024/0051639 A1 Feb. 15, 2024

Related U.S. Application Data

(60) Provisional application No. 63/397,274, filed on Aug. 11, 2022.

(51) Int. Cl.
  *B62M 6/45* (2010.01)
  *B62M 9/16* (2006.01)
(52) U.S. Cl.
  CPC ................ *B62M 6/45* (2013.01); *B62M 9/16* (2013.01)
(58) Field of Classification Search
  CPC . B62M 6/45; B62M 9/16; B62M 6/00; B62M 9/00
  USPC ....................................................... 180/65.1
  See application file for complete search history.

(56) References Cited

U.S. PATENT DOCUMENTS

| | | | | |
|---|---|---|---|---|
| 7,108,097 B1* | 9/2006 | Bolton | ...................... | B62M 6/55 |
| | | | | 280/288.1 |
| 11,325,677 B2* | 5/2022 | Novikov | .................. | B62M 6/60 |
| 12,005,936 B2* | 6/2024 | Hart | ........................ | B61D 15/10 |
| 2004/0231905 A1* | 11/2004 | Kurita | ................. | B60L 15/2009 |
| | | | | 180/206.7 |
| 2016/0008193 A1* | 1/2016 | Schulke | .................... | A61G 5/10 |
| | | | | 180/2.2 |
| 2020/0262513 A1* | 8/2020 | Novikov | .................. | B62M 6/70 |
| 2021/0284203 A1* | 9/2021 | Hart | ........................ | B61D 15/10 |
| 2021/0354782 A1* | 11/2021 | Eveleigh | .............. | B62M 9/1242 |
| 2022/0134855 A1* | 5/2022 | Zhang | ...................... | B60K 1/00 |
| | | | | 180/65.1 |
| 2022/0306239 A1* | 9/2022 | Chan | ........................ | B62M 6/50 |

* cited by examiner

*Primary Examiner* — James A Shriver, II
*Assistant Examiner* — Hilary L Johns
(74) *Attorney, Agent, or Firm* — Jacob M. Ward; Ward Law Office LLC

(57) ABSTRACT

A pedal bar system includes a frame, a motor, a pedal shaft, a pedal assembly, and a tensioner. The motor is selectively operable in a forward mode and a reverse mode and is disposed on the frame. The motor shaft is rotatably coupled to the pedal shaft via a drive belt. The pedal assembly is rotatably coupled to the pedal shaft. The tensioner, in communication with the motor shaft and the pedal shaft via the drive belt, has a disengaged position and an engaged position. When the tensioner is in the disengaged position, the drive belt has insufficient tension to rotate the pedal shaft. Conversely, when the tensioner is in the engaged position, the drive belt has sufficient tension to rotate the pedal shaft. Importantly, the pedal shaft is not rotated by the motor in the reverse mode when the tensioner is in the disengaged position.

20 Claims, 8 Drawing Sheets

300

PROVIDING THE PEDAL BAR SYSTEM — 310

OPERATING THE PEDAL BAR SYSTEM WITH THE MOTOR COUPLED TO THE MOTOR SHAFT — 320

REMOVING THE SPIDER COUPLING FROM THE COUPLER, THEREBY DECOUPLING THE MOTOR FROM THE MOTOR SHAFT — 330

PEDAL BAR SYSTEM AND METHOD

CROSS REFERENCE TO RELATED APPLICATIONS

This application claims the benefit of U.S. Provisional Application Ser. No. 63/397,274, filed on Aug. 11, 2022. The entire disclosure of the above application is incorporated herein by reference.

FIELD

The present disclosure relates to a pedal bar system and more particularly, a pedal bar system with an auxiliary power source which can propel the pedal bar system, as well as methods for using the pedal bar system.

INTRODUCTION

This section provides background information related to the present disclosure which is not necessarily prior art.

Bicycles are a popular form of transportation that have the added benefit of providing exercise for the rider. Riding a bicycle can also provide a better vantage point to enjoy the local scenery. Unlike other vehicles, bicycles can be easily stored and hence can provide better storage and parking options, for example relative to vehicles such as automobiles. Accordingly, many cities offer bicycle sightseeing tours and pedal powered pub crawls. However, riding a bicycle in a crowded urban area can be dangerous, especially for inexperienced and/or inattentive riders.

Previous approaches to pedal bar systems have typically involved manual operation or limited functionality. Manual pedal bars require physical exertion from the users to propel the system forward, which can be tiring and limit the distance that can be covered. Additionally, manual pedal bars do not provide the option for reverse operation, limiting their maneuverability and usability in certain situations. Some existing pedal bar systems have attempted to address these limitations by incorporating electric motors. These systems allow for forward propulsion without the need for manual pedaling, providing a more comfortable and convenient experience for the users. However, these systems often lack the ability to operate in reverse. This limitation can be problematic in situations where the pedal bar needs to be maneuvered in tight spaces or when a quick change in direction is required.

Similar to most bicycles, pedal bars contain one-way sprockets which allow the rider to pedal in a forward direction to apply force and allow the pedal bar to be disengaged when the force is applied in a reverse direction. This lets the rider coast without moving the pedals, back-pedal to adjust their feet, and allows the rider to stand by and evenly distribute weight between the two pedals. Conventional pedal bars receive and distribute force via the one way sprocket to the pedals. When the pedal bar moves backwards, the chain is unable to slip over the one way sprocket, causing the pedals to move in reverse. Desirably, a pedal bar would militate against movement of the pedals when moving backwards, reducing the risk of awkward operation and discomfort to riders.

Accordingly, there is a continuing need for a pedal bar system that includes an auxiliary propulsion system. Desirably, the pedal bar system can prevent the pedals from moving when the pedal bar is moving backwards, reducing the risk of awkward operation and discomfort to riders.

SUMMARY

In concordance with the instant disclosure, a pedal bar system and method which can provide auxiliary propulsion and militate against pedal movement when the pedal bar is moving backwards, reducing the risk of awkward operation and discomfort to riders, has surprisingly been discovered.

In one embodiment, a pedal bar system can include a frame. A pedal bar system can include a motor disposed on the frame and selectively operable in a forward mode and a reverse mode, the motor having a motor shaft. A pedal bar system can include a pedal shaft disposed on the frame and rotatably coupled to the motor shaft via a drive belt. A pedal bar system can include a pedal assembly disposed on the frame and rotatably coupled to the pedal shaft. A pedal bar system can include a tensioner in communication with the motor shaft and the pedal shaft via the drive belt, the tensioner having a disengaged position and an engaged position, the drive belt having insufficient tension to rotate the pedal shaft when the tensioner is in the disengaged position, and the drive belt having sufficient tension to rotate the pedal shaft when the tensioner is in the engaged position, whereby the pedal shaft is not rotated by the motor in the reverse mode when the tensioner is in the disengaged position.

In another embodiment, the pedal bar system can have a first mode of operation and a second mode of operation. In the first mode of operation, a pedal assembly can be configured to selectively provide supplemental power to a motor. The motor can be configured to transmit power to wheels disposed on the frame of the pedal bar system. In the second mode of operation the pedal bar system is configured to receive power only from the pedal assembly, which is configured to transmit power to the wheels.

In a further embodiment, a method for using a pedal bar system can include providing the pedal bar system, including: a frame; a motor disposed on the frame and selectively operable in a forward mode and a reverse mode, the motor having a motor shaft; a pedal shaft disposed on the frame and rotatably coupled to the motor shaft via a drive belt; a pedal assembly disposed on the frame and rotatably coupled to the pedal shaft; a tensioner in communication with the motor shaft and the pedal shaft via the drive belt, the tensioner having a disengaged position and an engaged position, the drive belt having insufficient tension to rotate the pedal shaft when the tensioner is in the disengaged position, and the drive belt having sufficient tension to rotate the pedal shaft when the tensioner is in the engaged position; and a controller configured to operate the tensioner, whereby the pedal shaft is not rotated by the motor in the reverse mode when the tensioner is in the disengaged position. The pedal bar can be operated in the forward mode with the tensioner in the engaged position. The controller can actuate the controller to place the tensioner in the disengaged position. The pedal bar can be operated in the reverse mode.

In a yet further embodiment, a method for decoupling a motor of a pedal bar system can include providing the pedal bar system, including: a frame; a motor disposed on the frame and selectively operable in a forward mode and a reverse mode, the motor having a motor shaft; a pedal shaft disposed on the frame and rotatably coupled to the motor shaft via a drive belt; a pedal assembly disposed on the frame and rotatably coupled to the pedal shaft; a tensioner in communication with the motor shaft and the pedal shaft via the drive belt, the tensioner having a disengaged position and an engaged position, the drive belt having insufficient tension to rotate the pedal shaft when the tensioner is in the disengaged position, and the drive belt having sufficient tension to rotate the pedal shaft when the tensioner is in the engaged position; and a coupler configured to selectively couple the motor to the motor shaft, the coupler including a spider coupling, whereby the pedal shaft is not rotated by the motor in the reverse mode when the tensioner is in the disengaged position. The pedal bar system can be operated with the motor coupled to the motor shaft. The spider coupling can be removed, thereby decoupling the motor from the motor shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
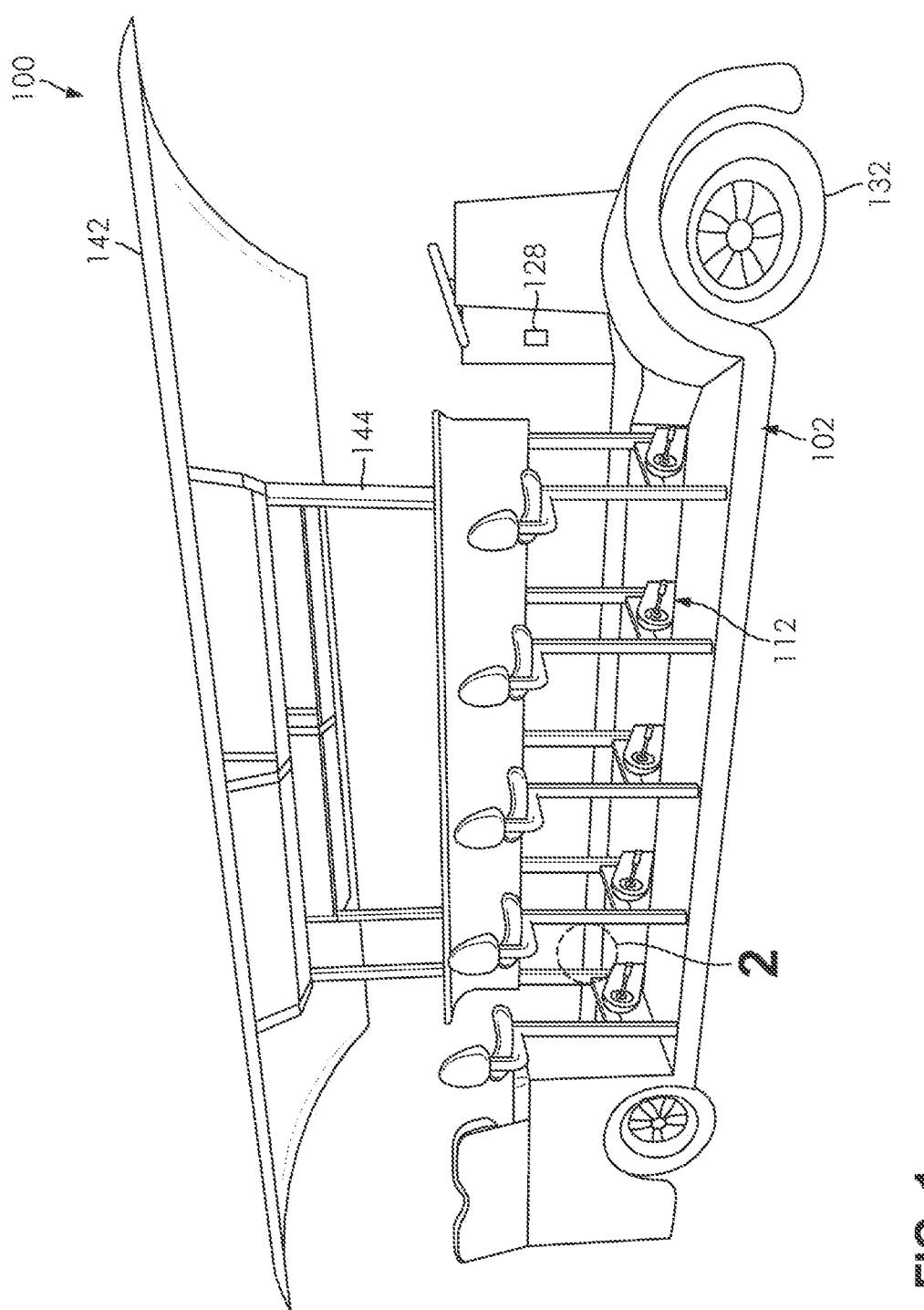
FIG. 1 is a front perspective view of a pedal bar system, according to one embodiment of the present disclosure.

The following description is merely exemplary in nature and is not intended to limit the present disclosure, application, or uses. It should be understood that throughout the drawings, corresponding reference numerals indicate like or corresponding parts and features. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a process reciting elements A, B and C specifically envisions embodiments consisting of, and consisting essentially of, A, B and C, excluding an element D that can be recited in the art, even though element D is not explicitly described as being excluded herein.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below," or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology relates to a pedal bar system and method, as shown generally in FIGS. 1-11. The pedal bar system 100 can have a frame 102 and a motor 104 disposed within the frame 102. The motor 104 can be selectively operable in a forward mode and a reverse mode. In certain non-limiting examples, the motor 104 is an electric motor 104.

The motor 104 can be configured to rotate a motor shaft 106. A pedal shaft 108 can be disposed on the frame 102. The pedal shaft 108 can be rotatably coupled to the motor shaft 106 via a drive belt 110. A pedal assembly 112 can be disposed on the frame 102. The pedal assembly 112 can be rotatably coupled to the pedal shaft 108. A tensioner 114 can be in communication with the motor shaft 106 and the pedal shaft 108 via the drive belt 110.

The tensioner 114 can have a disengaged position and an engaged position, as discussed in greater detail herein. The drive belt 110 can have insufficient tension to rotate the pedal shaft 108 when the tensioner 114 is in the disengaged position, and the drive belt 110 can have sufficient tension to rotate the pedal shaft 108 when the tensioner 114 is in the engaged position. Accordingly, the pedal shaft 108 is not rotated by the motor 104 and motor shaft 106 in the reverse mode when the tensioner 114 is in the disengaged position. The pedal bar system 100 can also include additional pulleys, for example, a pulley 109. The additional pulleys can assist with alignment of the drive belt 110 in operation. The motor shaft 106, the pedal shaft 108, and the tensioner 114 can include various pulleys and mechanical components, which allow the motor shaft 106, the pedal shaft 108, and the tensioner 114 to be in communication with the drive belt 110.

The pedal assembly 112 can include a sprocket 116, an overrunning clutch 118, and a chain 120. The sprocket 116 can be disposed on the frame 102 and the overrunning clutch 118 can be disposed on the pedal shaft 108. The chain 120 can rotatably couple the sprocket 116 and the overrunning clutch 118. The pedal assembly 112 and/or the drive belt 110 can be held in tension by additional attachments, for example, an attachment 111.

The sprocket 116 can be a chainwheel, a profiled wheel with teeth that mesh with a chain, track, or other perforated or indented material, or other suitable wheels or gears known to those with skill in the art. The sprocket 116 can be rotatably attached to a pair of crank arms 122 that are each rotatably coupled to a pedal 124. In further embodiments, the pedal assembly 112 can include a jockey wheel 126. The jockey wheel 126 can be a guide wheel and used to move, retain, locate, or add tension to the chain 120. In certain embodiments, the jockey wheel 126 can be retractable or adjustable.

The overrunning clutch 118 can be a one-way sprocket, a freewheel clutch, a one-way sprag clutch, or any number of other suitable mechanisms known to those of skill in the art. The overrunning clutch 118 can rotate and/or be rotated by the pedal shaft 108. The overrunning clutch 118 can militate against a transfer of force in one direction, in other words, the overrunning clutch 118 can militate against the pedal assemblies rotating when the motor 104 is powering the pedal shaft 108, in operation. When in the forward mode, the overrunning clutch 118 can militate against the motor 104 turning the pedal assembly 112. However, in certain embodiments, the rider can operate the pedal assembly 112 and provide auxiliary power to the motor 104 when in the forward mode. While the pedal bar system 100 is primarily configured to move through the use of the motor 104, the rider can supplement the propulsion of the pedal bar system 100 in the forward mode via the pedal assembly 112. The pedal assembly 112 can transfer additional force through the chain 120 to the overrunning clutch 118, which can assist the motor 104 in turning the pedal shaft 108. In this way, the rider can supplement and/or reduce the strain on the motor 104 without subjecting the rider to experience undesired movement and awkward operation.

It should be appreciated that the provided configurations allow riders to selectively participate and control the amount of physical exertion and exhaustion placed on the riders. Additionally, this can allow inexperienced riders, and riders with disabilities to participate without physically straining themselves. Furthermore, this can allow the pedal bar system 100 to be operated by fewer riders since the pedal bar system 100 contains a motor 104 that can propel the pedal bar system 100 without the aid of the riders. This can be particularly useful during sightseeing tours which utilize various modes of transport, or for riders who are travelling to a different destination.

Figures 2, 3:
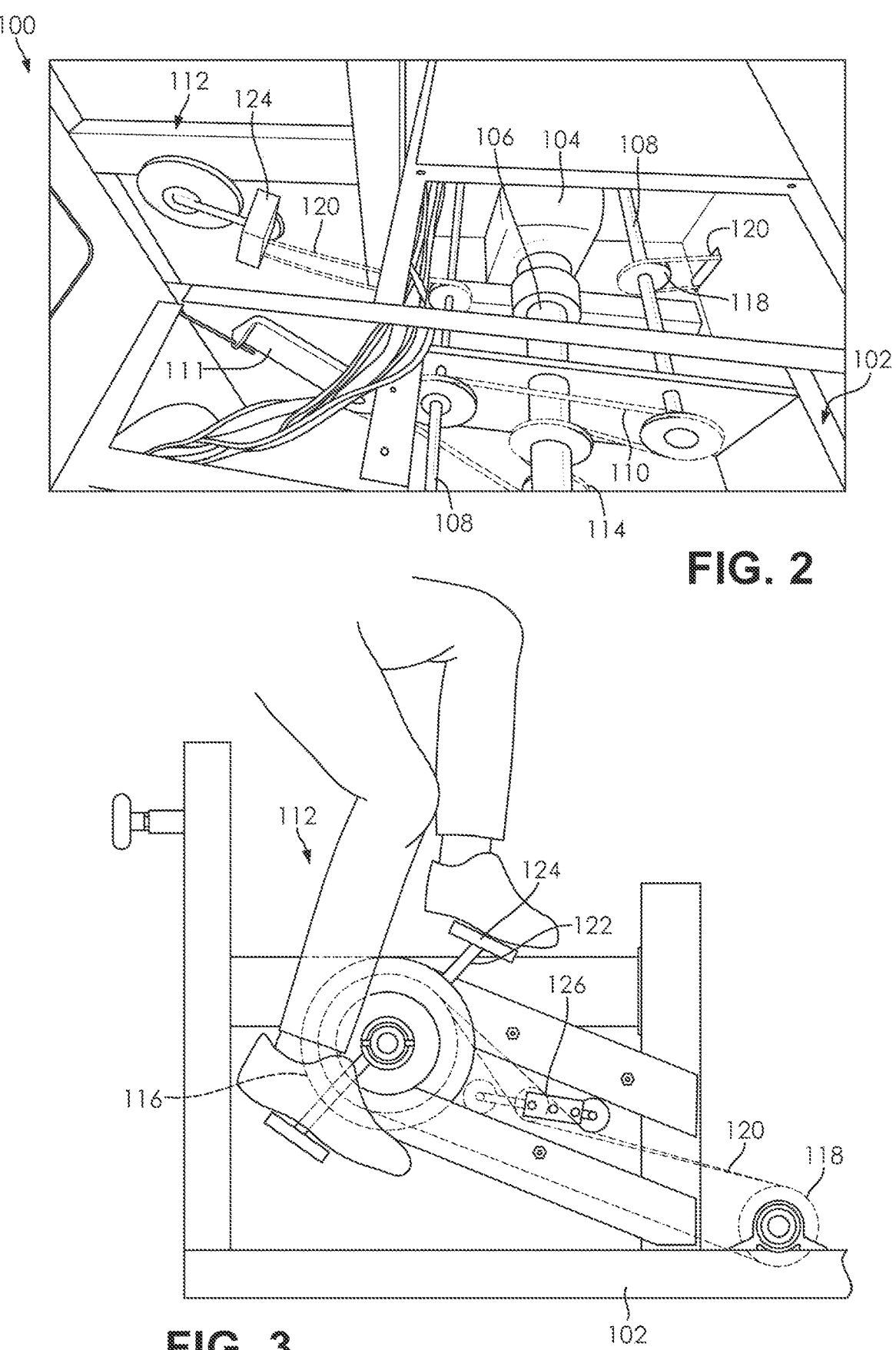
FIG. 2 is a top perspective view of a portion of a power drive of the pedal bar system of FIG. 1.
FIG. 3 is a side elevational view of a pedal assembly of the pedal bar system of FIG. 1.

With particular reference to FIGS. 1 and 3, the pedal bar system 100 can include multiple pedal assemblies 112 disposed along a length of the pedal shaft 108. The pedal bar system 100 can include various numbers of additional pedal shafts 108, as shown by the multiple instances of pedal shafts 108 and pedal assemblies 112 depicted in FIGS. 1, 2, 4, 6, and 7. The pedal shafts 108 can be disposed on the frame 102 adjacent to the motor shaft 106 and opposite the pedal shaft 108. Each pedal shaft 108 can be rotatably connected to the motor shaft 106 via the drive belt 110. A plurality of pedal assemblies 112 can be disposed along a length of the pedal shaft 108. For pedal bar systems 100 which allow the riders to contribute towards propelling the pedal bar system 100, this can increase the amount of propulsion that the pedal assemblies 112 can generate.

Each one of the pedal assemblies 112 can include a seat. The seat can be disposed adjacent to the related pedal assembly 112. The seat can include a back and can be selected from a number of suitable seats known to those with skill in the art.

Figure 6:
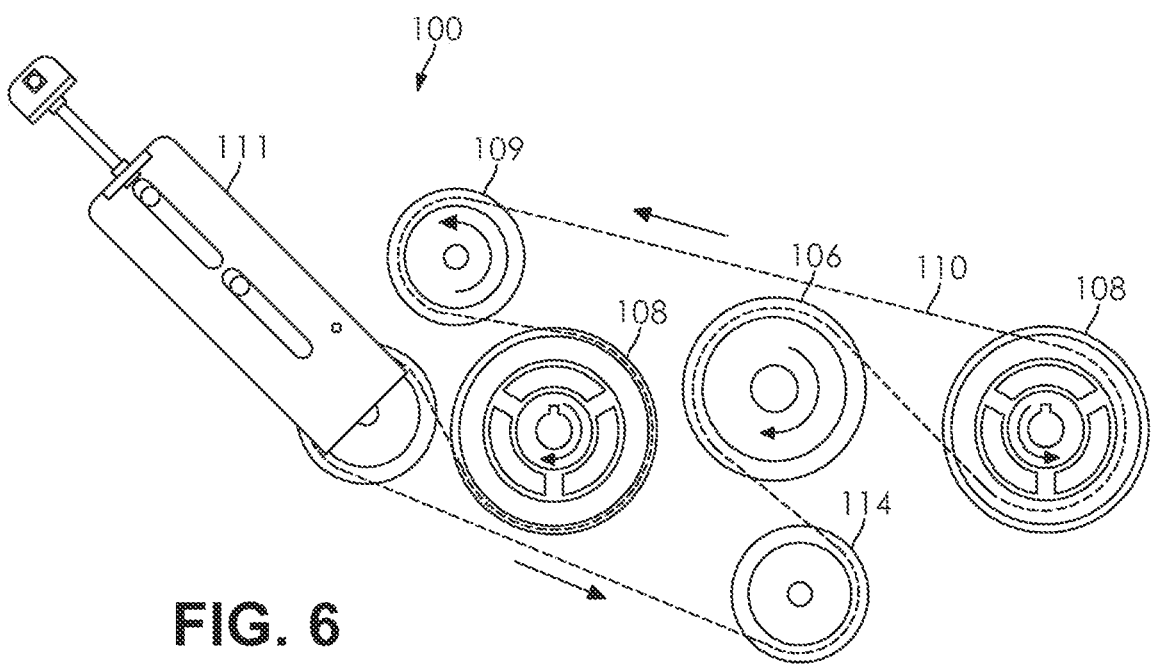
FIG. 6 is a side elevational view of the portion of the power drive shown in FIG. 4, depicting a tensioner in an engaged position.

As shown in FIG. 6, when the tensioner 114 is engaged, the motor shaft 106 and the pedal shafts 108 are rotatably coupled via the drive belt 110, forming a powertrain. The motor 104 is rotatably coupled to the drive belt 110 through the motor shaft 106, and the pedal assemblies 112 are rotatably coupled to the drive belt 110 through the pedal shafts 108.

Figure 7:
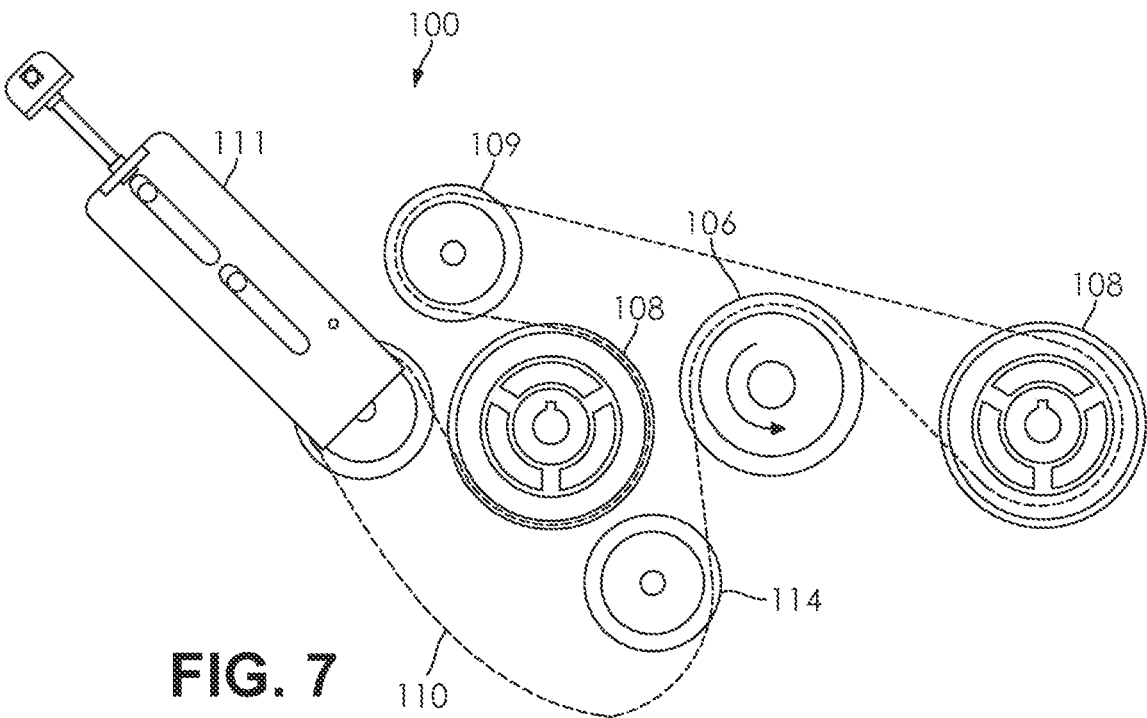
FIG. 7 is a side elevational view of the portion of the power drive shown in FIG. 4, depicting the tensioner in the disengaged position.

With reference to FIGS. 6-7, the tensioner 114 can include a linear actuator (not shown). The linear actuator can be configured to move the tensioner 114 laterally between the engaged and disengaged position, which can be performed automatically via a controller as described in greater detail herein. Specifically, lateral movement of the tensioner 114 can be configured to affect tension in the drive belt 110. When the tensioner 114 is in the engaged position, for example as shown in FIG. 6, the drive belt 110 can be clinched against the pedal shaft 108. This allows the motor 104 to turn the pedal shaft 108. As shown in FIG. 6, the tensioner 114 provides tension to the drive belt 110 such that the drive belt 110 is engaged with the motor shaft 106, pedal shafts 108, pulley 109, attachment 111, as well as the tensioner 114 itself. The drive belt 110 becomes slack when the tensioner 114 is in the disengaged position, for example, as shown in FIG. 7. As shown in FIG. 7, the tensioner 114 provides no tension to the drive belt 110 such that the drive belt 110 is disengaged with the motor shaft 106, pedal shafts 108, pulley 109, attachment 111, as well as the tensioner 114 itself. In this way, the motor shaft 106 is free to rotate by itself in either direction, including the reverse direction as shown in FIG. 7. Accordingly, there is no transfer of force between the motor 104 and the pedal shaft 108 when the tensioner 114 is in the disengaged position. This is particularly advantageous when the pedal bar system 100 is operated in the reverse mode. A skilled artisan can select a suitable linear actuator within the scope of the present disclosure.

In the non-limiting examples shown in FIGS. 6-7, the tensioner 114 moves to the left, creating slack in the drive belt 110. The arrows around the motor shaft 106, the pedal shafts 108, and the pulley 109 depict the movement of the motor shaft 106 and the pedal shafts 108 caused by the tension from drive belt 110 in the engaged and disengaged modes. The slack in the drive belt 110 allows the motor 104 to rotate the motor shaft 106 without moving the pedal shafts 108. Accordingly, when the tensioner 114 is disengaged, the motor shaft 106 and the pedal shafts 108 are no longer rotatably coupled to the drive belt 110, allowing the motor 104 and the pedal assemblies 112 to operate independently. This is particularly advantageous when the motor 104 is running in reverse, as the motor 104 is disconnected from the pedal assembly 112 and therefore will not rotate the pedal shafts 108 and hence the pedal assembly 112 backward, which could cause the pedal 124 or crank arm 122 to strike the rider.

It should be appreciated that additional components can be used to form a drive train of the pedal bar system 100 including one or more of the following components: flywheel; transmission; transmission brakes; propeller shafts; drive shafts; u-joints; balancers; clutch; gearbox; differential; transaxles; constant-velocity joints; torque converters; additional axles coupled to the wheels. A skilled artisan can implement these components to tailor the configuration of the pedal bar system 100, including adapting the geometry, dimensions, and number and location of pedal assemblies 112 and pedal shafts 108, as desired.

The pedal bar system 100 can have a controller 128 and a human machine interface (not shown), which can be used to operate the pedal bar system 100. The controller 128 and the human machine interface can control headlights, auxiliary lights within the frame 102, motor 104, audio, speed, acceleration, steering, emergency brake, forward mode, reverse mode, and the tensioner 114.

In particular, an operator can utilize the controller to place the pedal bar system 100 into reverse. When the operator operates the controller 128 to do so, the linear actuator of the tensioner 114 can laterally move the tensioner. Certain embodiments of the pedal bar system 100 can include a limit switch 130, such as a whisker switch. The limit switch 130 can be activated by the position or limit of the tensioner 114. When the linear actuator moves the tensioner 114 to the disengaged position, the tensioner 114 contacts the limit switch 130. Accordingly, moving the tensioner 114 into the disengaged position (e.g., via the controller 128) activates the limit switch 130 (e.g., by coming into contact with the limit switch 130). The limit switch 130 can be in communication with the controller 128, and when the controller 128 receives a signal from the limit switch 130 that it has been actuated, the controller 128 can place the pedal bar system 100 into reverse mode. This provides slack for the drive belt

110 and militates against the transfer of force to the pedal assembly 112. In this way, the reverse mode of the pedal bar system 100 prevents the motor 104 from moving the pedal assembly 112, thereby increasing rider safety.

The controller 128 and the human machine interface can use controls for the tensioner 114 to switch the pedal bar system 100 between the forward mode and reverse mode. In one embodiment, switching the pedal bar system 100 to the reverse mode actuates the tensioner 114 into the disengaged position. In turn, the tensioner 114 activates the limit switch 130, putting the pedal bar system 100 into reverse mode. This multistep process provides a failsafe, ensuring that the pedal assembly 112 does not injure or inconvenience riders.

Figure 4:
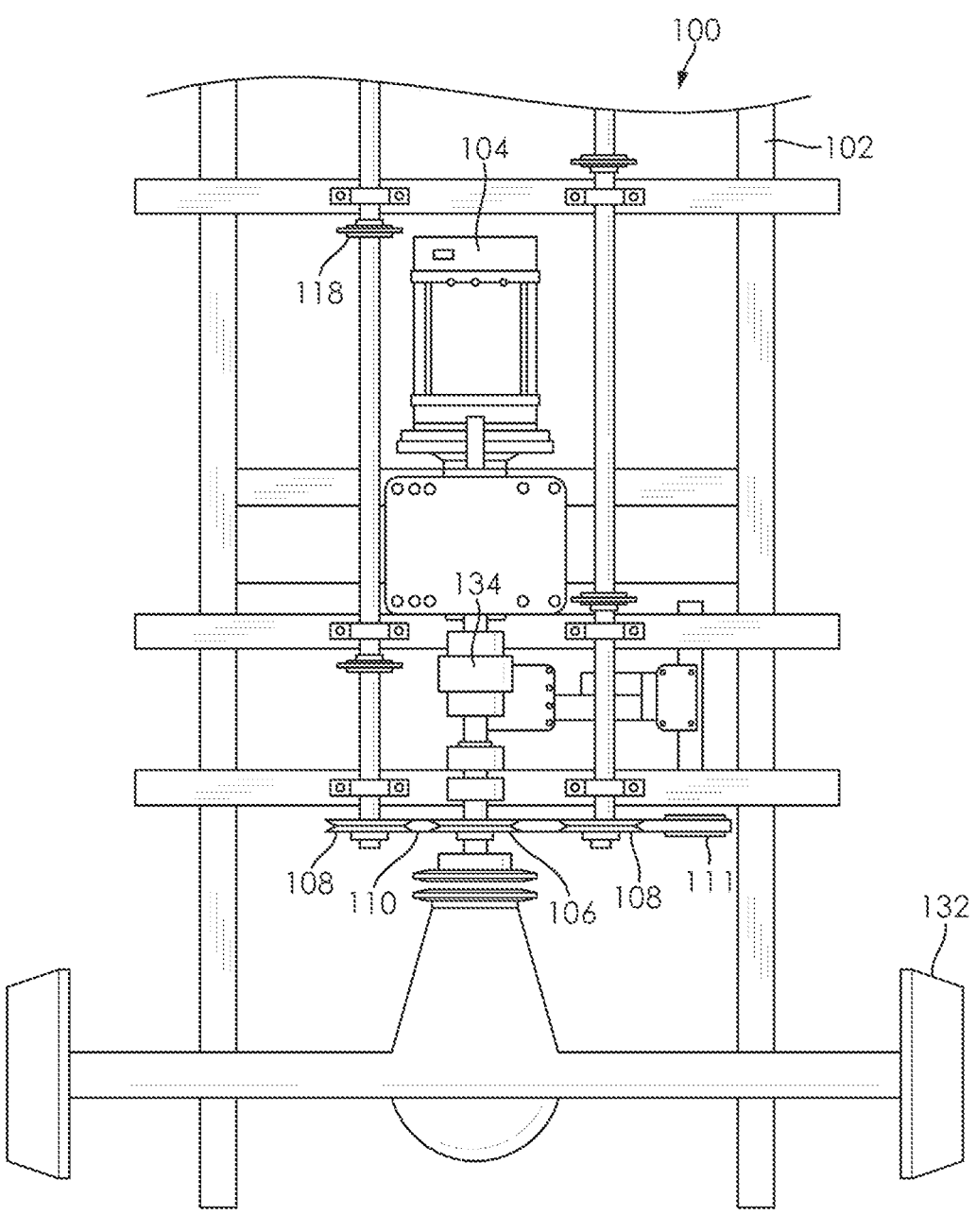
FIG. 4 is a top plan view of the portion of the power drive shown in FIG. 2.
Figure 5:
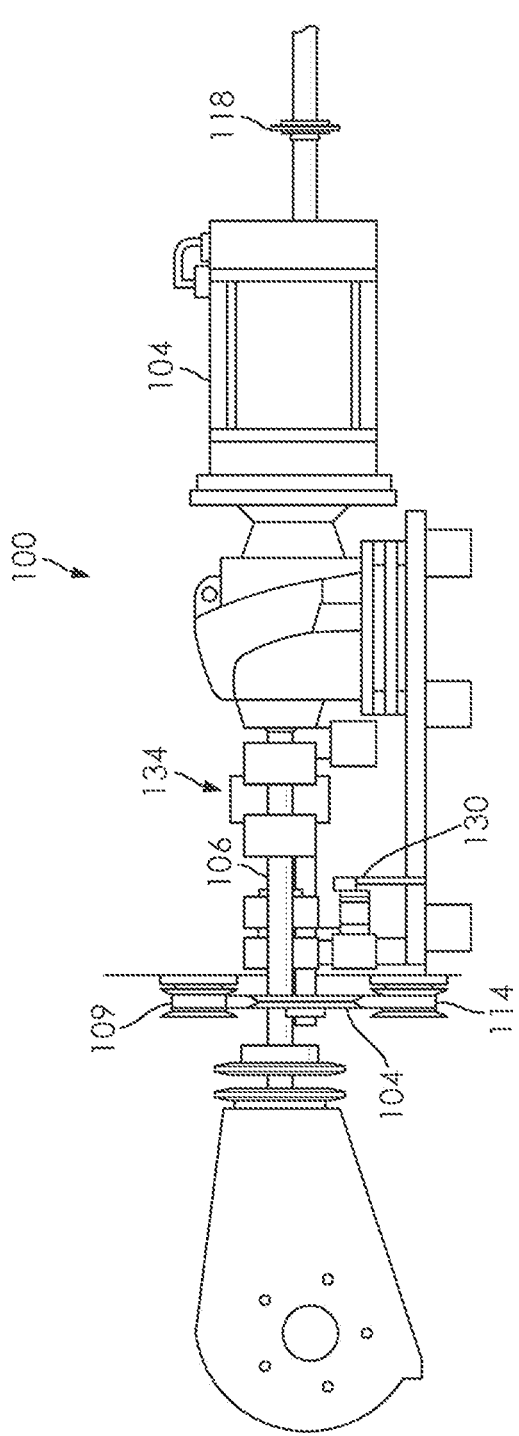
FIG. 5 is a side elevational view of a portion of the power drive shown in FIG. 4.

With particular reference to FIGS. 1 and 4, the pedal bar system 100 can include wheels 132 in communication with the motor shaft 106. The motor shaft 106 is configured to deliver propulsion to the wheels 132, which are disposed on the frame 102. Persons of skill in the art can substitute the wheels 132 for other types of suitable mechanisms, increase or decrease the number of wheels 132 on the pedal bar system 100, or change the arrangement of wheels 132.

In certain embodiments, the motor 104 can be decoupled from the motor shaft 106. When the motor 104 is coupled from the motor shaft 106, the motor 104 is configured to transmit power to wheels 132 disposed on the frame 102 of the pedal bar system 100 and the pedal assembly 112 can selectively provide supplemental power to the motor 104 via the pedal shaft 108. When the motor 104 is decoupled, the pedal bar system 100 is configured to receive power only from the pedal assembly 112, which transmits power to the wheels 132. Advantageously, decoupling the motor 104 can allow the pedal bar system 100 to be towed or simply powered by the pedal assemblies 112, where desired.

Figure 8:
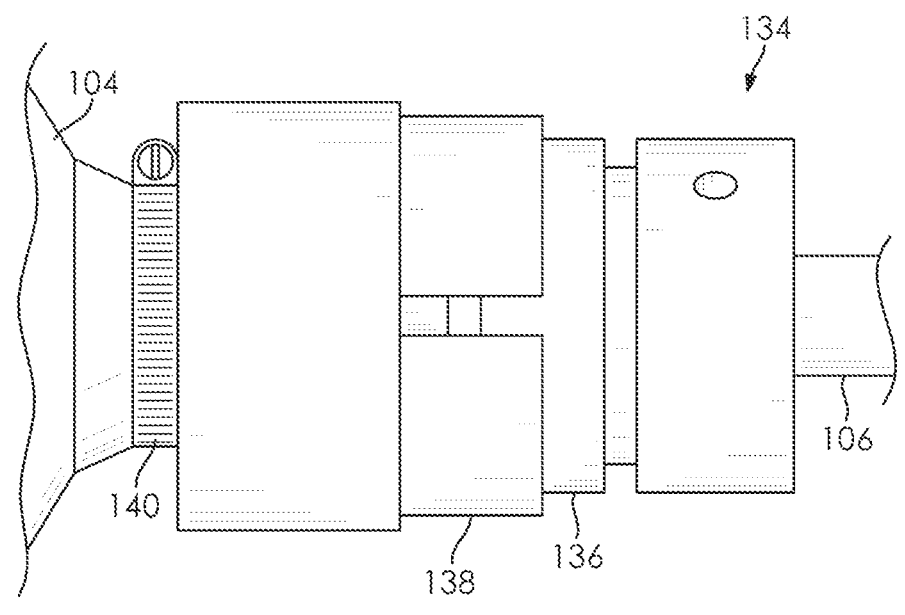
FIG. 8 is an enlarged, side elevational view of a coupling of the portion of the power drive shown in FIG. 2, depicting a motor coupled to a motor shaft.
Figure 9:
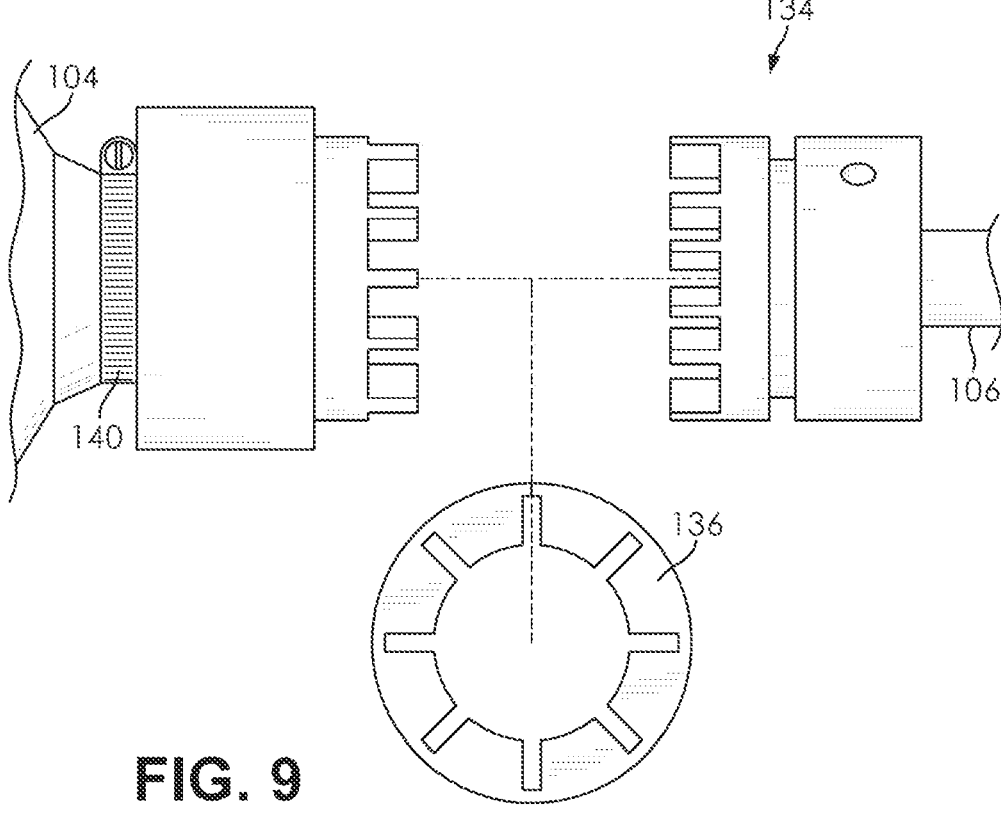
FIG. 9 is an enlarged, side elevational view of a coupling of the portion of the power drive shown in FIG. 2, depicting a motor decoupled to a motor shaft.

As shown in FIGS. 4 and 8-9, the pedal bar system 100 can include a coupler 134 that can be used to selectively couple and decouple the motor 104 and the motor shaft 106. In one non-limiting example, the coupler 134 can be a jaw coupler. The coupler 134 can include a spider coupling 136. The spider coupling 136 can be disposed between the motor 104 and the motor shaft 106 when the two are coupled. The spider coupling 136 can be selectively removed in order to decouple the motor 104 and the motor shaft 106. The spider coupling 136 can be manufactured from rubber or polyurethane, as non-limiting examples.

In one particular embodiment, the coupler 134 can further include a cover 138 and a clamp 140. The cover 138 can be disposed over the spider coupling 136 in operation to limit wear to the spider coupling 136, in operation. The clamp 140 can be disposed on the cover 138 to secure the cover 138 to the spider coupling 136.

In certain embodiments, the controller 128 of the pedal bar system 100 can include a speed dial. The speed dial can control the speed of the pedal bar system 100. The dial can be used by the driver to help maintain a speed that matches the pedaling of the riders. The dial can set the max speed when an accelerator is fully depressed. The driver can set the speed that matches the peddling, which can eliminate the need for the operator to hold a less than full throttle position of the accelerator. Advantageously, this can improve the comfort of the passengers, in particular, if the speed is not well matched to a comfortable pedaling pace/force, the passengers will need to pedal faster than is comfortable, in order to feel pedaling resistance.

In certain embodiments, the pedal bar system 100 can include a roof 142. The roof 142 can be selectively raised and lowered. The roof 142 can be mounted on one or more telescoping poles/supports 144, which can change a height of the roof 142. The telescoping poles 144 can be hydraulicly activated. Advantageously, the movable roof 142 can be helpful when needing to store the pedal bar system 100 in a low clearance garage. Also, lowering roof 142 can be helpful to shield passengers from rain/wind, in operation.

Figure 10:
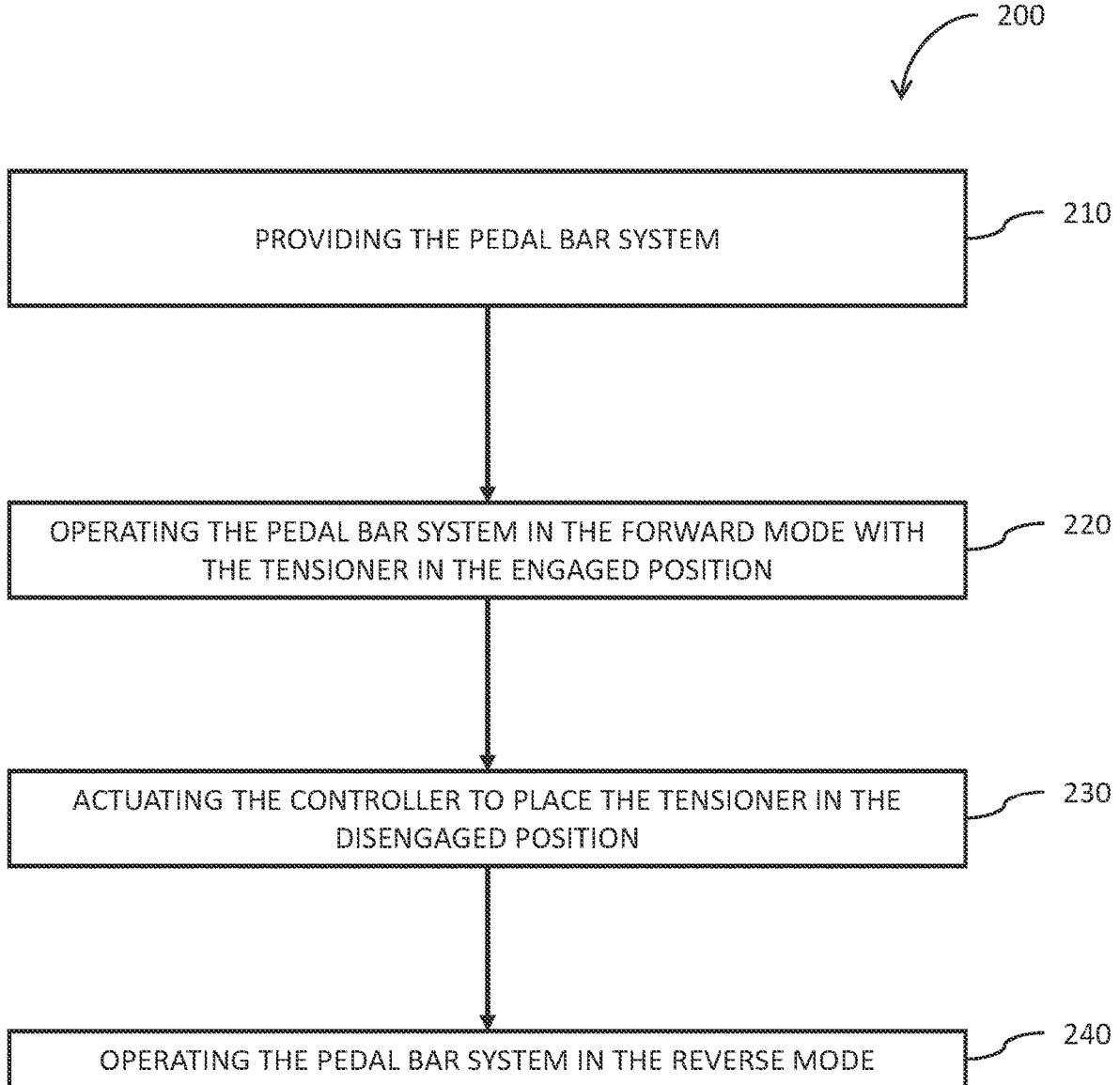
FIG. 10 is a flowchart depicting a method of for using a pedal bar system, according to an embodiment of the present disclosure.

FIG. 10 is a flowchart of an example method 200 for using a pedal bar system 100. The method 200 can include a step 210 of providing the pedal bar system 100, as described in greater detail herein. At step 220, the pedal bar system 100 can be operated in the forward mode with the tensioner 114 in the engaged position. At step 230, the controller 128 can be actuated to place the tensioner 114 in the disengaged position. At step 240, the pedal bar system 100 can be operated in the reverse mode.

Figure 11:
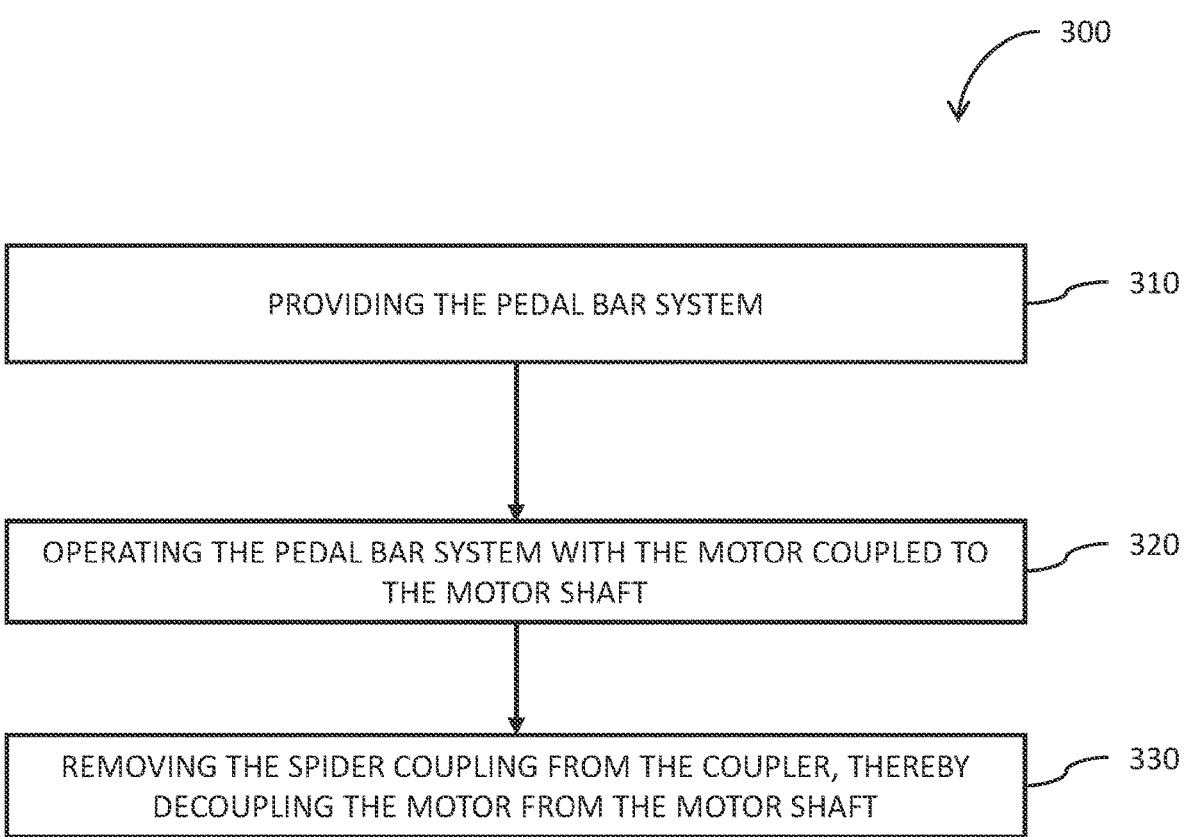
FIG. 11 is a flowchart depicting a method for decoupling a motor of a pedal bar system, according to another embodiment of the present disclosure.

FIG. 11 is a flowchart of an example method for a method for decoupling a motor of a pedal bar system 100. The method 300 can include a step 310 of providing the pedal bar system 100, as described in greater detail herein. At step 320, the pedal bar system 100 can be operated with the motor 104 coupled to the motor shaft 106. At step 330, the spider coupling 136 can be removed from the coupler 134, thereby decoupling the motor from the motor shaft.

Advantageously, the pedal bar system 100 can provide auxiliary propulsion and militate against pedal movement when the pedal bar system 100 is moving backwards. In certain examples, the method 200 occurs automatically when the human machine interface is operated to put the pedal bar system 100 into the reverse mode. In particular examples, the method 300 can be used in the event of motor 104 failure and malfunction. In more particular examples, the method 300 can be used if the motor 104 runs out of fuel or, in the case of an electric motor 104, charge. It is also contemplated that the pedal bar system 100 can be recoupled through the method after issues with the pedal bar system 100, such as motor failure, malfunction, loss of fuel or charge, are resolved.

Example embodiments are provided so that this disclosure will be thorough, and will fully convey the scope to those who are skilled in the art. Numerous specific details are set forth such as examples of specific components, devices, and methods to provide a thorough understanding of the embodiments of the present disclosure. It will be apparent to those skilled in the art that specific details need to be employed, that example embodiments can be embodied in many different forms, and that neither should be construed to limit the scope of the disclosure. In some example embodiments, well-known processes, well-known device structures and well-known technologies are not described in detail. Equivalent changes, modifications, and variations of some embodiments, materials, compositions, and methods can be made within the scope of the present technology, with substantially similar results.

What is claimed is:

1. A pedal bar system, comprising:
   a frame;
   a motor disposed on the frame and selectively operable in a forward mode and a reverse mode, the motor having a motor shaft;
   a pedal shaft disposed on the frame and rotatably coupled to the motor shaft via a drive belt;
   a pedal assembly disposed on the frame and rotatably coupled to the pedal shaft;
   a tensioner in communication with the motor shaft and the pedal shaft via the drive belt, the tensioner having a disengaged position and an engaged position, the drive belt having insufficient tension to rotate the pedal shaft when the tensioner is in the disengaged position, and the drive belt having sufficient tension to rotate the pedal shaft when the tensioner is in the engaged position; and
   a limit switch disposed adjacent to the tensioner and configured to be activated by the tensioner in the disengaged position, the limit switch configured to reverse the motor,
   wherein upon the limit switch being activated by the tensioner in the disengaged position, the motor of the pedal bar system is placed into the reverse mode, but the pedal shaft is not rotated by the motor in a reverse direction due to a slack in the drive belt.

2. The pedal bar system of claim 1, further comprising a controller configured to operate the tensioner.

3. The pedal bar system of claim 2, further comprising a linear actuator configured to move the tensioner.

4. The pedal bar system of claim 1, wherein the motor is an electric motor.

5. The pedal bar system of claim 1, wherein the pedal assembly includes a sprocket, a chain, and an overrunning clutch, the overrunning clutch disposed on the pedal shaft.

6. The pedal bar system of claim 1, further comprising a plurality of pedal assemblies, each pedal assembly rotatably coupled to the pedal shaft.

7. The pedal bar system of claim 1, further comprising another pedal shaft disposed on the frame opposite of the pedal shaft.

8. The pedal bar system of claim 7, further comprising another plurality of pedal assemblies rotatably coupled to the another pedal shaft.

9. The pedal bar system of claim 1, wherein the motor is configured to be selectively coupled to and decoupled from the motor shaft.

10. The pedal bar system of claim 9, wherein the pedal assembly is configured to selectively provide supplemental power to the motor and the motor is configured to transmit power to wheels disposed on the frame when the motor is coupled to the motor shaft.

11. The pedal bar system of claim 9, wherein system is configured to receive power only from the pedal assembly when the motor is decoupled from the motor shaft.

12. The pedal bar system of claim 9, further comprising a coupler configured to selectively couple and decouple the motor to the motor shaft.

13. The pedal bar system of claim 12, wherein the coupler includes a jaw coupler.

14. The pedal bar system of claim 12, wherein the coupler includes a spider coupling.

15. The pedal bar system of claim 14, wherein the spider coupling is configured to be selectively removed to decouple the motor from the motor shaft.

16. The pedal bar system of claim 1, further comprising a roof disposed on the frame.

17. The pedal bar system of claim 16, wherein the roof is selectively movable via telescoping arms disposed on the frame.

18. A method for using a pedal bar system comprising:
   providing the pedal bar system, including:
      a frame;
      a motor disposed on the frame and selectively operable in a forward mode and a reverse mode, the motor having a motor shaft;
      a pedal shaft disposed on the frame and rotatably coupled to the motor shaft via a drive belt;
      a pedal assembly disposed on the frame and rotatably coupled to the pedal shaft;

a tensioner in communication with the motor shaft and the pedal shaft via the drive belt, the tensioner having a disengaged position and an engaged position, the drive belt having insufficient tension to rotate the pedal shaft when the tensioner is in the disengaged position, and the drive belt having sufficient tension to rotate the pedal shaft when the tensioner is in the engaged position;

a limit switch disposed adjacent to the tensioner and configured to be activated by the tensioner in the disengaged position, the limit switch configured to reverse the motor; and a controller configured to operate the tensioner, wherein upon the limit switch being activated by the tensioner in the disengaged position, the motor of the pedal bar system is placed into the reverse mode, but the pedal shaft is not rotated by the motor in a reverse direction due to a slack in the drive belt;

operating the pedal bar system in the forward mode with the tensioner in the engaged position;

actuating the controller to place the tensioner in the disengaged position; and operating the pedal bar system in the reverse mode.

19. A method for decoupling a motor of a pedal bar system including:

providing the pedal bar system, including:

a frame;

a motor disposed on the frame and selectively operable in a forward mode and a reverse mode, the motor having a motor shaft;

a pedal shaft disposed on the frame and rotatably coupled to the motor shaft via a drive belt;

a pedal assembly disposed on the frame and rotatably coupled to the pedal shaft;

a tensioner in communication with the motor shaft and the pedal shaft via the drive belt, the tensioner having a disengaged position and an engaged position, the drive belt having insufficient tension to rotate the pedal shaft when the tensioner is in the disengaged position, and the drive belt having sufficient tension to rotate the pedal shaft when the tensioner is in the engaged position; and a limit switch disposed adjacent to the tensioner and configured to be activated by the tensioner in the disengaged position, the limit switch configured to reverse the motor, a coupler configured to selectively couple the motor to the motor shaft, the coupler including a spider coupling, wherein upon the limit switch being activated by the tensioner in the disengaged position, the motor of the pedal bar system is placed into the reverse mode, but the pedal shaft is not rotated by the motor in a reverse direction due to a slack in the drive belt;

operating the pedal bar system with the motor coupled to the motor shaft;

removing the spider coupling from the coupler, thereby decoupling the motor from the motor shaft.

20. The pedal bar system of claim 3, wherein the linear actuator is configured to automatically move the tensioner laterally between the engaged and disengaged position.

\* \* \* \* \*